United States Patent [19]

Trueb et al.

[11] Patent Number: 5,054,513
[45] Date of Patent: Oct. 8, 1991

[54] PROTECTIVE SYSTEM FOR P-TRAP

[76] Inventors: Steven R. Trueb, 78 Mountain Rd., Vernon, Conn. 06066; Thomas W. Trueb, 105 Pinnace Rd., Ellington, Conn. 06029

[21] Appl. No.: 569,995

[22] Filed: Aug. 20, 1990

[51] Int. Cl.$^5$ .................. F16L 7/00; F16L 9/22
[52] U.S. Cl. ................. 137/375; 137/247.51; 137/797; 285/47; 138/155; 138/158
[58] Field of Search ............... 138/155, 158, DIG. 11, 138/157; 137/247.49, 247.51, 797, 375; 285/47

[56] References Cited

U.S. PATENT DOCUMENTS

| | | | |
|---|---|---|---|
| 2,037,625 | 4/1936 | Goepel et al. | 137/247.51 |
| 2,650,180 | 8/1953 | Walker | 154/44 |
| 2,761,949 | 9/1956 | Colton | 285/47 |
| 2,937,662 | 5/1960 | Green | 138/25 |
| 3,153,546 | 10/1964 | Dunn | 285/13 |
| 3,177,528 | 4/1965 | Flower et al. | 18/36 |
| 3,402,731 | 9/1968 | Martin | 137/375 |
| 3,559,694 | 2/1971 | Volberg | 138/147 |
| 3,598,157 | 8/1971 | Farr | 138/157 |
| 3,719,209 | 3/1973 | Rush et al. | 138/177 |
| 3,960,181 | 6/1976 | Baur et al. | 138/178 |
| 4,205,105 | 5/1980 | Blundell | 428/36 |
| 4,240,462 | 12/1980 | Bankstahl | 137/797 |
| 4,441,743 | 4/1984 | Steenbergen | 285/21 |
| 4,463,780 | 8/1984 | Shultz et al. | 138/178 |
| 4,669,509 | 6/1987 | Botsolas | 138/178 |
| 4,713,271 | 12/1987 | Searl et al. | 285/47 |
| 4,840,201 | 6/1989 | Botsolas | 138/178 |

FOREIGN PATENT DOCUMENTS 1249974  2/1989  Canada ................. 285/47

Primary Examiner—A. Michael Chambers
Attorney, Agent, or Firm—Ira S. Dorman

[57] ABSTRACT

Slit pieces of thermal insulating molded rubber are configured to conform to under-sink piping so as to provide protection against burn injury from contact with hot surfaces. Three pieces cooperate with one another to enclose the installed P-trap assembly, and a fourth piece is severable into two parts which serve to enclose the hot water valve and its supply pipe and tube.

15 Claims, 3 Drawing Sheets

PROTECTIVE SYSTEM FOR P-TRAP

BACKGROUND OF THE INVENTION

Regulations in place in many municipalities require that the so-called "P-trap," and the under-sink hot water supply piping, be insulated so as to prevent injury from contact with hot metal surfaces. Wheelchair bound individuals are at particular risk.

The required thermal insulation may be supplied by wrapping or otherwise applying lengths of insulation (such as of foam rubber and the like) about the pipes and fixtures. Such practices are however undesirable for a number of reasons: application is often difficult and time-consuming; the applied insulating material tends to become disoriented and displaced; the finished installation is typically unaesthetic; and often the result is simply ineffectual.

The prior art suggest a wide variety of pipe covering techniques and structures. For example, Far et al., U.S. Pat. No. 3,598,157 discloses preformed covering pieces made of foamed plastics and configured for various pipe fittings. Blundell U.S. Pat. No. 4,205,105 shows an elongated pipe-insulating structure that is axially slit along one side, and Martin U.S. Pat. No. 3,402,731 provides foamed insulating sleeves for pipe elements.

U.S. Pat. Nos. 2,650,180, 2,937,662, 3,153,546, 3,559,694, 4,441,743 and 4,840,201, to Walker, Green, Dunn, Volberg, Steenbergen and Botsolas, respectively, all show encased insulating structures applied to pipes and fittings; U.S. Pat. Nos. 3,960,181, 4,463,780 and 4,669,509, to Baur et al., Schultz et al. and Botsolas, respectively, provide one-piece covering wrappings fabricated from flexible plastic materials; and U.S. Pat. Nos. 3,177,528 and 3,719,209, to Flower et al. and Rush et al., respectively, are directed to electrically insulated coatings for pipe fittings and to extruded plastic plumbing traps.

Despite the activity in the art indicated by the foregoing, a need remains for means by which under-sink piping and fixtures can quickly, easily, and inexpensively by thermally insulated. It is accordingly a broad object of the present invention to provide such means, and it is a related object to provide a piping installation that is insulated thereby.

More specific objects of the invention are to provide a thermal insulation system and article which are adapted for ready installation upon under-sink piping and fixtures, so as to provide highly effective protection against burn injury from hot metal surfaces; and to provide a system and article having the foregoing features and advantages, which are, in addition, of relatively simple and inexpensive construction, quick and easy to apply, and neat, stable, and aesthetically pleasing when in place.

SUMMARY OF THE INVENTION

It has now been found that certain of the foregoing and related objects of the invention are attained by the provision of a thermal insulation system comprising a first, substantially J-shaped tubular piece, a second, substantially straight tubular piece, and a third, substantially L-shaped tubular piece, the pieces being fabricated from a resiliently yieldable material and being of substantially the same cross-sectional dimensions along their lengths. Each of the pieces of the system is slit along its length to permit spreading of marginal portions so as to enable emplacement over a corresponding part of an installed P-trap piping assembly, with end portions of the "second" and "third" pieces disposed in overlapped relationship to end portions at the opposite ends of the "first" piece. One of the end portions at both locations of overlap is of enlarged cross-sectional dimensions, relative to the "same" dimensions, so as to accommodate therewithin nut structure by which the parts of the encased piping assembly are joined to one another.

In preferred embodiments the enlarged end portions will be on the "second" and "third" pieces, and will be dimensioned to overlap the end portions of the "first" piece. Each of the enlarged end portions may have a circumferential groove extending about it, for the receipt of a clamping band, and the distal end portion of at least one of the "second" and "third" pieces (and most desirably of both), remote from the location of overlap, will have a plurality of circumferential grooves at longitudinally spaced locations therealong. In particularly preferred embodiments, the "first" piece will include a toric section that has a clean-out aperture, formed in a centralized location through a radially outer wall portion thereof. The material from which the pieces of the system are fabrication will normally be a resiliently yieldable rubber, and will desirably have a foamed structure.

Other objects of the invention are attained by the provision of a thermally insulated P-trap installation comprising a tubular piping assembly in combination with the insulation system herein described. The piping assembly consists of a substantially straight sink tailpiece member, a substantially J-shaped J-bend, a substantially L-shaped waste arm, and nut structure joining the tailpiece and waste arm to the opposite ends of the J-band, in end-to-end relationship.

The first, second and third pieces of the insulation system are emplaced, respectively, over the J-bend; the tailpiece and the waste arm of the piping assembly so as to provide the insulated P-trap installation. A banding element will usually surround the end portions of the insulating pieces at each location of overlap, to secure the pieces in assembly with the piping components.

Additional objects are attained by the provision of an article for the thermal insulation of a hot water supply control valve and its associated piping. The article comprises an elongate, rectilinear, tubular piece, fabricated from a resiliently yieldable material having thermal insulating properties, and slit along its length to permit spreading of marginal portions so as to enable emplacement. The tubular piece has a valve-cover section of relatively large cross-sectional dimensions adjacent one end thereof, a tube-cover section of relatively small cross-sectional dimensions adjacent the opposite end thereof, and a pipe cover section of intermediate cross-sectional dimensions therebetween. A annular flange portion defines a relatively small, valve-stem receiving first aperture disposed on the longitudinal axis of the tubular piece at its "one" end, and a second aperture is disposed on the slit and extends radially through the wall of the valve-cover section for receiving a laterally extending valve body neck portion. In its preferred form, the article will have indicia on the pipe cover section, marking a location for severance; severance will produce a first part for covering the valve body and a connected length of pipe, and a second part for covering the valve neck portion and the water supply tube that extends from it.

DETAILED DESCRIPTION OF THE ILLUSTRATED EMBODIMENTS

Figures 1, 2:
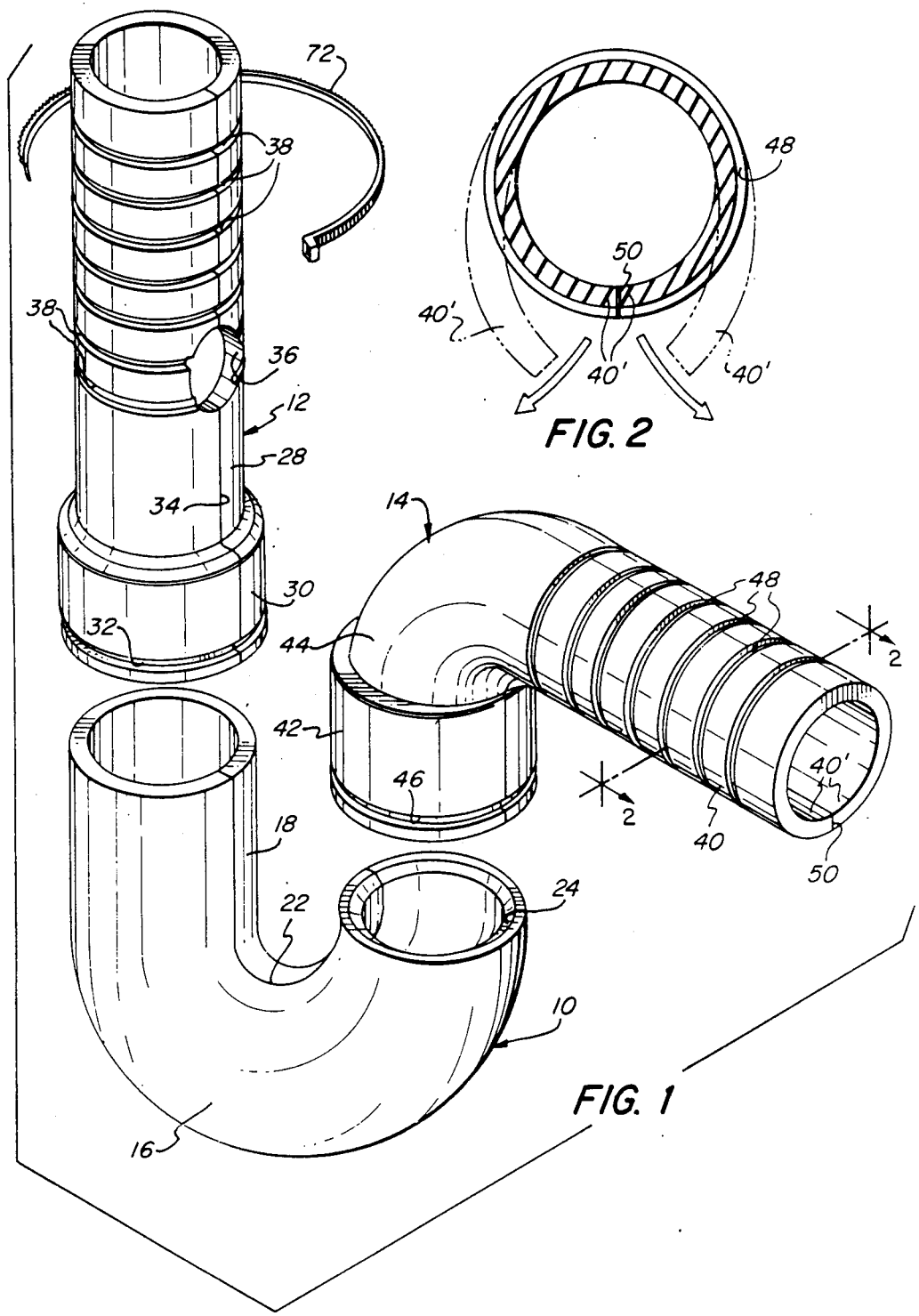
FIG. 1 is an exploded perspective view of a thermal insulation system embodying the present invention.
FIG. 2 is a sectional view of the waste arm-covering piece employed in the system, taken along line 2—2 of FIG. 1, with spread marginal portions thereof shown in phantom line.
Figure 3:
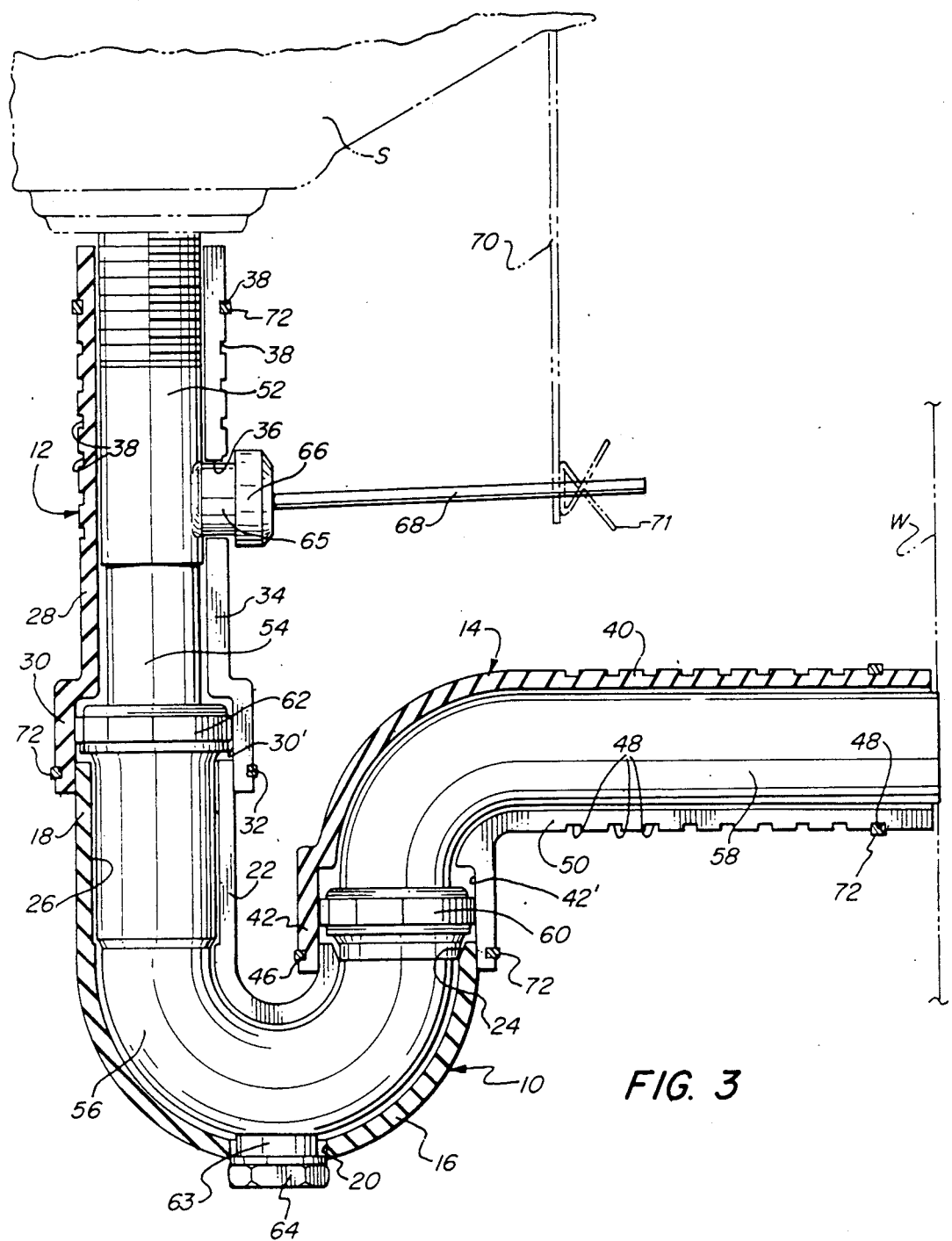
FIG. 3 is a sectional view showing the system of the FIG. 1, installed upon P-trap under-sink plumbing.

Turning now in detail to FIGS. 1-3 of the drawings, therein illustrated is a thermal insulation system embodying the invention and consisting of a substantially J-shaped tubular piece, a substantially straight tubular piece, and a substantially L-shaped tubular piece, the pieces being generally designated respectively by the numerals 10, 12 and 14, and each being fabricated from a resiliently yieldable rubbery material. The J-shaped piece 10 includes a toric section 16 and a straight section 18; the toric section 16 has a clean-out aperture 20, formed through a radially outer wall portion thereof in a medial plane and in an arcuately centralized location, and a slit 22 extends through the opposite wall portion of the piece along its entire length. The open end of the toric section 16 has an internal chamfer 24 thereabout; also the internal diameter of the straight section 18 is somewhat larger than that of the remainder of the piece, so as to define a slightly enlarged passage portion 26 therewithin.

The straight piece 12 consists of an elongate cylindrical section 28 and a short collar section 30 at one end; slit 34 extends longitudinally along its entire length. A circumferential groove 32 surrounds the collar section 30 adjacent its open end, and a series of similar grooves 38 are provided at equidistantly spaced locations on the opposite end portion of the cylindrical section 28. A round hole 36 is cut through the section 28 on the slit 34 and at a location intermediate its ends; perhaps it should be noted, however, that the hole 36 would normally be cut at the time of installation, and would not usually be present in the manufactured part, as supplied.

L-shaped piece 14 consists of a straight section 40 and a collar section 42, with a 90° arcuate section 44 therebetween. The collar section 42 has a circumferential groove 46 extending thereabout adjacent its open end, and a series of like grooves 48 surround the opposite end portion at equidistantly spaced locations. The piece 14 is longitudinally slit at 50, thereby defining relatively displaceable marginal portions 40' along the length thereof.

With particular reference now to FIG. 3, the drain plumbing for a sink "S" (shown in phantom line) is depicted, and includes a tailpiece member consisting of two, telescopically interengaged parts 52, 54, a J-bend 56, and a waste arm 58 extending from wall "W". The plumbing components have standard flanged and threaded end portions (not shown), which enable them to be joined by the nuts 60, 62 in end-to-end relationship. A clean-out access port is formed through the outer wall of the toric section of the J-bend 56, and is surrounded by a short neck portion 63 and is normally closed by the "nut" or cap 64. The upper part 52 of the tailpiece assembly is threadably engaged with the bottom of the sink S, and is formed with an access port surrounded by a short neck portion 65, partially closed by an annular cap 66, through which extends the operating arm 68 for a "pop-up" drain plug mechanism (not illustrated). In conventional manner, the linkage 70 connects the arm 68 to an operating handle, and is secured on the arm 68 by a spring clip 71.

The J-shaped piece 10 of the insulation system is installed over the J-bend 58 of the piping assembly with the neck portion 63 and nut 64 of the clean-out structure protruding through the aperture 20. This is achieved of course simply by spreading the marginal portions along the slit 22, which portions thereafter resume their original shape due to the inherent resiliency, or elastic memory, of the material from which the piece is fabricated. The chamfer 24 surrounding the open end of the toric section 16 accommodates a frustoconical portion of the joint structure with which the nut 60 is associated, which parts are accommodated within the recess 42' defined by collar portion 42 on the L-shaped piece 14, applied in the same manner to the waste arm 58. Plastic bands 72, seated within the circumferential grooves 46 and 48 at the opposite ends of the piece 14, secure it to the J-shaped piece 10 and to the P-trap components 56, 58; it will be appreciated that the bands 72 incorporate an automatic locking ratchet mechanism, the structure of which is best indicated in FIG. 1.

The straight tubular piece 12 is similarly applied to encase the tailpiece assembly 52, 54, with the nut 62 and associated parts seated within the enlarged recess 30' formed by the collar portion 30 thereof. The straight piece 12 is secured to the J-shaped piece 10 and the drain components 52, 56 by use of banding elements 72 seated within the circumferential grooves 32 and 38, with the plug-mounting structure 65, 66, protruding laterally through the hole 36 therein.

Figure 4:
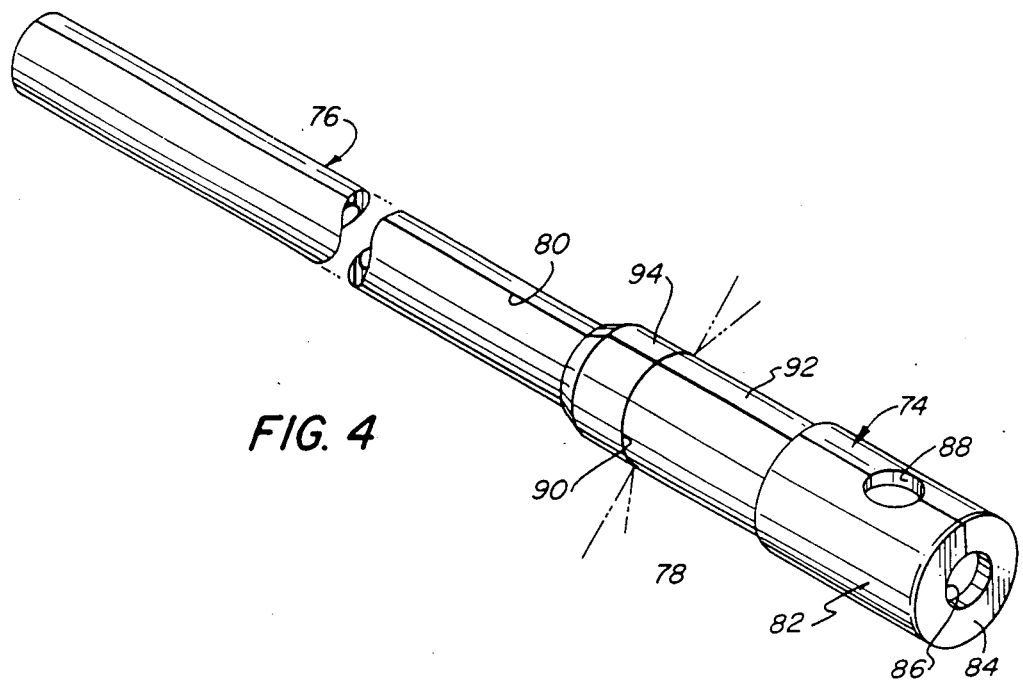
FIG. 4 is a fragmentary perspective view of an article embodying the invention, adapted for the thermal insulation of a hot water supply control valve and its associated piping.

As can be seen, the opposite end portions of the J-shaped piece 18 are telescopically engaged within the inwardly extending recesses 30', 42' of the overlapping collar portions 30, 42 on the tubular piece 12 and the L-shaped piece 14, respectively. Turning next to FIG. 4 of the drawings, therein illustrated is a tubular piece fabricated from a resiliently yieldable rubbery material and adapted for application to under-sink hot water supply plumbing. It consists of a valve-cover section, generally designated by the numeral 74, adjacent one end, a tube-cover section, generally designated by the numeral 76, adjacent the opposite end, and a pipe-cover section, generally designated by the numeral 78, disposed therebetween. As can be seen, in cross-sectional dimensions the valve-cover section 74 is relatively large, the tube-cover section 76 is relatively small, and the pipe-cover section 78 is of intermediate size. An annular flange portion 84 overlies the open end of the cylindrical wall 82, and defines an axial aperture; a radial aperture 88 is formed through the sidewall 82, and is disposed on the slit 80, which extends along the entire length of the piece. Severance mark 90 circumscribes the pipe-cover section 78, and defines pipe- and neck-covering portions 92, 94 thereon.

Figure 5:
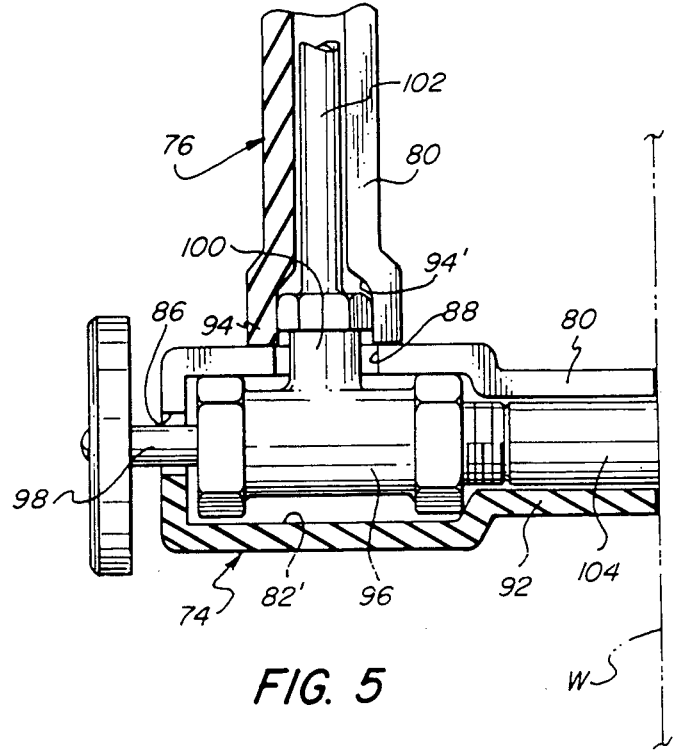
FIG. 5 is an elevational view, in partial section, showing the article of FIG. 4 divided into two parts and applied to under-sink hot water supply plumbing.

FIG. 5 illustrates the manner in which the tubular piece of FIG. 4 is employed to insulate a water supply control valve and its associated piping. As can be seen, the piece has been divided at the mark 90, to produce two parts. The part that includes the valve-cover section 74 is emplaced over the valve body 96, which is seated within the chamber 82' thereof with the stem 98 of the valve operating handle extending through the axial aperture 86 and with the neck portion 100 extending through the radial aperture 88. The hot water supply pipe 104, which extends from the wall W, is encased within the portion 92 that is attached to the section 74.

The other half of the cut tubular piece includes the remaining portion 94 of the pipe-cover section 78, and the entire tube-cover section 76 (except of course to the extent that is may be shortened during installation). The section 76 is installed over the tube 102 (which is attached to the neck portion 100 of the valve body, and serves to direct water to the sink faucet), with the enlarged portion 94 seated over the neck portion 100 and its associated nut, accommodated within the recess 94'. In this manner the control valve and its associated piping are insulated against injurious contact.

Although the drawings and the corresponding portions of the specification describe the best mode contemplated for carrying out the invention, it will be understood that variations can be made without departing from the concept hereof. For example, changes may be made to the shapes and features of the several insulating pieces to best accommodate peculiarities of particular installations or styles of piping. The circumferential grooves and cooperating plastic bands shown in the drawings provide a highly effective means for securing the parts in assembly, but suitable alternatives may occur to those skilled in the art, and may be employed. It might be mentioned that the series of grooves 38 and 48 on the straight and L-shaped pieces 12, 14, respectively, serve not only to receive the bands 72 in a very neat and functionally desirable manner, but also to designate locations for cutting; as a practical matter, these pieces may be manufactured in lengths that will often be excessive, intending that they be cut to size at the time of installation. As mentioned previously, the hole 36 will usually be made in the course of installation, requiring only that the plumber measure from the nut of the tailpiece to the pop-up assembly, and cut the hole accordingly.

As has been mentioned, the preferred material for fabrication of the insulating pieces will usually be a synthetic elastomeric material, such as a polyurethane or silicon rubber, so as to provide the desired resiliency for installation. In many instances it will be found that optimal thermal insulation and other properties will be afforded by the use of a foamed plastic material, and for aesthetic reasons it may be especially preferred to employ materials of white or light coloration.

It might also be mentioned that the insulating pieces will normally have a nominal wall thickness ranging from ⅛ inch to ½ inch, with ¼ inch providing a most desirable balance of functional and cost factors. Finally, it will be appreciated that the system described can be used to insulate piping of plastic as well as of metal, and that it will normally afford protection against impact injury, as well as against burns.

Thus, it can be seen that the present invention provides means by which under-sink plumbing and fixtures can quickly, easily and inexpensively be thermally insulated, and it provides a piping installation utilizing the same. The insulation system and article embodying the invention are adapted for ready installation upon under-sink plumbing and fixtures, so as to provide highly effective protection against burn injury from hot metal surfaces; and they are of relatively simple and inexpensive construction, quick and easy to apply, and neat, stable and aesthetically pleasing when in place.

Having thus described the invention, what is claimed is:

1. A thermal insulation system for the P-trap piping assembly of a sink or the like, comprising a first, substantially J-shaped tubular piece, a second, substantially straight tubular piece, and a third, substantially L-shaped tubular piece; each of said pieces having opposite end portions, each being fabricated as a single unit from a resiliently yieldable material having thermal insulating properties, and each being longitudinally slit to permit spreading of the marginal portions extending along said slit, for facile installation; said first piece having a substantially uniform external cross section along its entire length, and said second and third piece having said uniform external cross section along major portions of their lengths of each of said second and third pieces constituting a collar portion of enlarged cross-section relative to said uniform cross section, and defining therewithin an inwardly extending recess having said uniform cross section so as to permit said collar portions to telescopically overlap and engage said end portions of said first piece when installed thereadjacent.

2. The system of claim 1 wherein each of said enlarged end portions has a circumferential groove thereabout for the receipt of a clamping band.

3. The system of claim 1 wherein the distal end portion of at least one of said second and third pieces, remote from said collar portion thereof, has a plurality of circumferential grooves extending thereabout at longitudinally spaced locations therealong.

4. The system of claim 1 wherein said material is of rubbery character.

5. The system of claim 4 wherein said material has a foamed structure.

6. The system of claim 1 wherein said first piece includes a toric section having clean-out aperture defining structure formed in a centralized location on a radially outer wall portion thereof.

7. A thermally insulated P-trap installation for a sink or the like, comprising:

a tubular piping assembly consisting of a substantially straight sink tailpiece member, a substantially J-shaped J-bend, a substantially L-shaped waste arm, and nut structure joining said tailpiece member and waste arm in end-to-end relationship to the opposite ends of said J-bend; and a thermal insulation system comprising a first, substantially J-shaped tubular piece, a second, substantially straight tubular piece, and a third, substantially L-shaped tubular piece; each of said pieces having opposite end portions, each being fabricated as a single unit from a resiliently yieldable material having thermal insulating properties, and each being longitudinally slit to permit spreading of the marginal portions extending along said slit, for facile installation; said first piece having a substantially uniform external cross section along its entire length, and said second and third pieces having said uniform external cross section along major portions of their lengths, one of said end portions of each of said second and third pieces constituting a collar portion of enlarged cross-section relative to said uniform cross section, and defining therewithin an inwardly extending recess having said uniform cross section so as to permit said collar portions to telescopically overlap and engage said end portions of said first piece when installed thereadjacent, and to accommodate said nut structure therewithin; said first, second and third pieces being installed, respectively, over said J-bend, said tailpiece member, and said waste arm of said piping assembly, with said collar portions of said second and third pieces disposed in telescopically overlapped and engaged relationship to said end portions of said first piece.

8. The installation of claim 7 additionally including a banding element surrounding said collar portions to secure said pieces in assembly with the components of said piping assembly.

9. The installation of claim 7 wherein said material from which said pieces are fabricated is of rubbery character and has a foamed structure.

10. The installation of claim 7 wherein said J-bend of said piping assembly includes a toric section having outwardly projecting clean-out structure formed in a centralized location through a radially outer wall portion thereof, and wherein said first piece of said insulation system includes a toric section having a clean-out aperture formed through the wall portion thereof corresponding to said J-bend wall portion, said clean-out structure being in registry with and accessible through said clean-out aperture.

11. A system for the insulation of the piping for a sink or the like, comprising a first, substantially J-shaped tubular piece, a second, substantially straight tubular piece, a third, substantially L-shaped tubular piece, and a fourth, elongate, rectilinear tubular piece, said pieces being fabricated from a resiliently yieldable material having thermal insulating properties, each being slit along its length to permit spreading of marginal portions so as to enable facile installation, said first, second and third pieces being of substantially the same cross-sectional dimensions along their lengths, and each having opposite end portions, said pieces being adapted for installation with end portions of said second and third pieces disposed in telescopically overlapped, engaged relationship with said end portions of said first piece, one of said end portions at both locations of overlap being of enlarged cross-sectional dimensions, relative to said same dimensions; said fourth piece having adjacent one end thereof a valve-cover section of relatively large cross-sectional dimensions, having adjacent the opposite end thereof a tube-cover section of relatively small cross-sectional dimensions, and having therebetween a pipe cover section of intermediate cross-sectional dimensions, said valve cover section having an annular flange portion defining a relatively small first aperture disposed on the longitudinal axis of said fourth piece at said one end thereof, and having spaced therefrom, and disposed on said slit thereof, structure defining a second aperture extending radially therethrough.

12. The system of claim 11 wherein said fourth piece has indicia on said pipe cover section thereof marking a location for severance to produce from said piece a first part for covering a valve body and pipe, and a second part for covering a water supply tube.

13. An article for the thermal insulation of a hot water supply control valve and associated piping, comprising an elongate, rectilinear, tubular piece having opposite ends, being fabricated as a single unit from a resiliently yieldable material having thermal insulating properties, and being slit along its length to permit spreading of the marginal portions extending along said slit, for facile installation, said tubular piece having adjacent one end thereof a valve-cover section of relatively large cross-sectional dimensions, having adjacent the opposite end thereof a tube-cover section of relatively small cross-sectional dimensions, and having therebetween a pipe-cover section of intermediate cross-sectional dimensions, said valve cover section having an annular flange portion defining a relatively small first aperture disposed on the longitudinal axis of said piece at said one end thereof, and having spaced therefrom, and disposed on said slit thereof, structure defining a second aperture extending radially therethrough, said piece having indicia thereon marking a location for severance to produce from said piece a first part for covering a valve body and pipe, and a second part for covering a water supply tube.

14. The article of claim 13 wherein said material is of rubbery character.

15. The article of claim 15 wherein said material has a foamed structure.

* * * * *

UNITED STATES PATENT AND TRADEMARK OFFICE
CERTIFICATE OF CORRECTION

PATENT NO. : 5,054,513

DATED : October 8, 1991

INVENTOR(S) : Steven R. Trueb and Thomas W. Trueb

It is certified that error appears in the above-identified patent and that said Letters Patent is hereby corrected as shown below:

Claim 1, column 6, line 18, delete the word "piece," and substitute therefor --pieces--.

Claim 1, column 6, line 20, insert --, one of said end portions-- after the word "lengths."

Signed and Sealed this

Twenty-seventh Day of April, 1993

Attest:

MICHAEL K. KIRK

*Attesting Officer*   Acting Commissioner of Patents and Trademarks